US012656921B2

(12) United States Patent
Zhang et al.

(10) Patent No.: US 12,656,921 B2
(45) Date of Patent: *Jun. 16, 2026

(54) TOUCH STRUCTURE, TOUCH DISPLAY PANEL AND DISPLAY DEVICE

(71) Applicants:Chengdu BOE Optoelectronics Technology Co., Ltd., Sichuan (CN); BOE TECHNOLOGY GROUP CO., LTD., Beijing (CN)

(72) Inventors: Yuanqi Zhang, Beijing (CN); Yi Zhang, Beijing (CN); Chang Luo, Beijing (CN); Shun Zhang, Beijing (CN); Tianci Chen, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,348

(22) Filed: Jan. 6, 2025

(65) Prior Publication Data

US 2025/0147631 A1      May 8, 2025

Related U.S. Application Data

(63) Continuation of application No. 18/262,197, filed as application No. PCT/CN2022/074113 on Jan. 26, 2022, now Pat. No. 12,248,650.

(51) Int. Cl.
G06F 3/044       (2006.01)
G06F 3/041       (2006.01)

(52) U.S. Cl.
CPC .......... G06F 3/0446 (2019.05); G06F 3/0412 (2013.01); G06F 3/0443 (2019.05);
(Continued)

(58) Field of Classification Search
CPC . G06F 3/044–0448; G06F 2203/04111; G06F 2203/04112
See application file for complete search history.

(56) References Cited

U.S. PATENT DOCUMENTS 8,493,349 B2 *   7/2013  Hwang ................. G06F 3/0446
                                                    345/173
9,459,750 B2 *  10/2016  Han ...................... G06F 3/0446
(Continued)

OTHER PUBLICATIONS

Non-final Office Action of U.S. Appl. No. 19/047,686 dated Dec. 5, 2025.

*Primary Examiner* — Patrick F Marinelli
(74) *Attorney, Agent, or Firm* — Calfee, Halter & Griswold LLP

(57)        ABSTRACT

A touch structure includes first touch electrodes with first electrode blocks and an adapter bridge and second touch electrodes with second electrode blocks, the adapter bridge is connected to a guide portion overlapping with channel line(s) of a boundary of the first electrode block or the second touch electrode, partial adapter line overlaps with partial channel line of a boundary of the first electrode block and/or the second touch electrode; the adapter line connected to the guide portion overlaps with partial channel line of the boundary of the first electrode block or the second touch electrode; A region where the channel lines of the first electrode block are intersected is a channel intersection region, a boundary of an orthographic projection of the adapter intersection region on the display substrate is located outside a boundary of an orthographic projection of the channel intersection region on the display substrate.

20 Claims, 6 Drawing Sheets

(52) U.S. Cl.
 CPC .. *G06F 3/0448* (2019.05); *G06F 2203/04111*
  (2013.01); *G06F 2203/04112* (2013.01)

(56) References Cited

U.S. PATENT DOCUMENTS

| | | | | |
|---|---|---|---|---|
| 9,519,174 | B2 * | 12/2016 | Kim | G06F 3/0446 |
| 10,095,362 | B2 * | 10/2018 | Hirakata | G06F 3/0446 |
| 10,866,664 | B2 * | 12/2020 | Miyamoto | G06F 3/0443 |
| 10,963,082 | B2 * | 3/2021 | Lin | G06F 3/0446 |
| 11,023,058 | B2 * | 6/2021 | Park | G06F 3/04164 |
| 11,782,542 | B2 * | 10/2023 | Miyamoto | G09G 3/3225 |
| | | | | 345/173 |
| 12,123,753 | B2 * | 10/2024 | Shen | G01D 5/24 |
| 12,254,159 | B2 | 3/2025 | Zhang et al. | |
| 2011/0141037 | A1 * | 6/2011 | Hwang | G06F 3/0446 |
| | | | | 345/173 |
| 2014/0111709 | A1 * | 4/2014 | Kim | G02F 1/13338 |
| | | | | 349/12 |
| 2015/0234425 | A1 * | 8/2015 | Kim | G06F 3/0412 |
| | | | | 345/174 |
| 2015/0261370 | A1 * | 9/2015 | Yoo | G06F 3/0412 |
| | | | | 345/173 |
| 2015/0346866 | A1 * | 12/2015 | Kusunoki | G06F 15/0216 |
| | | | | 345/174 |
| 2016/0070406 | A1 * | 3/2016 | Han | G06F 3/0446 |
| | | | | 345/173 |
| 2016/0282989 | A1 * | 9/2016 | Hirakata | G06F 3/0446 |
| 2017/0147116 | A1 * | 5/2017 | Lee | G06F 3/0446 |
| 2018/0032188 | A1 * | 2/2018 | Park | G06F 3/0446 |
| 2018/0120998 | A1 * | 5/2018 | Jeong | G06F 3/0443 |
| 2018/0143720 | A1 * | 5/2018 | Kim | G06F 3/04164 |
| 2018/0190723 | A1 * | 7/2018 | Han | G06F 3/0412 |
| 2018/0329549 | A1 * | 11/2018 | Miyamoto | G06F 3/0446 |
| 2019/0050078 | A1 * | 2/2019 | Hamada | G06F 3/0443 |
| 2019/0294284 | A1 * | 9/2019 | Akimoto | G06F 3/0446 |
| 2021/0026483 | A1 * | 1/2021 | Miyamoto | G06F 3/0412 |
| 2021/0373691 | A1 * | 12/2021 | Li | G06F 3/0412 |
| 2023/0043343 | A1 * | 2/2023 | Cho | G06F 3/0446 |
| 2024/0045533 | A1 * | 2/2024 | Miyamoto | G09G 3/3225 |
| 2024/0256094 | A1 * | 8/2024 | Zhang | G06F 3/0412 |
| 2024/0264704 | A1 * | 8/2024 | Zeng | G06F 3/0446 |
| 2024/0288975 | A1 * | 8/2024 | Zhang | G06F 3/0443 |
| 2025/0147631 | A1 * | 5/2025 | Zhang | G06F 9/00 |

* cited by examiner

TOUCH STRUCTURE, TOUCH DISPLAY PANEL AND DISPLAY DEVICE

CROSS-REFERENCE

The present application is a Continuation of U.S. application Ser. No. 18/262,197, filed on Jul. 20, 2023, which is based on U.S. National Stage of International Application No. PCT/CN2022/074113, filed on Jan. 26, 2022, the entire content of which is incorporated herein by reference for all purposes. No new matter has been introduced.

TECHNICAL FIELD

The present disclosure relates to a field of touch technology, and more particularly, to a touch structure, a touch display panel and a display device.

BACKGROUND

Touch display panels have been widely used in terminal devices such as mobile phones, tablet computers and the like, and when displaying images, the touch display panel may achieve the human-computer interaction through a touch operation. Among the touch display panels, a mutual capacitive touch display panel is relatively common, which determines a touch position to achieve the touch operation by sensing a change in capacitance. However, abnormalities such as touch failures or error may occur in the existing mutual capacitive touch display panels.

It should be noted that the information disclosed in the above BACKGROUND section is only for enhancing the understanding of the background of the present disclosure, and thus may include information that does not constitute the prior art known to those of ordinary skill in the art.

SUMMARY

According to a first aspect of the present disclosure, a touch structure is provided and is arranged on a side of a display substrate, where the touch structure includes a plurality of first touch electrodes and a plurality of second touch electrodes, the first touch electrodes are distributed at intervals along a row direction, the first touch electrode includes a plurality of first electrode blocks and an adapter bridge, the plurality of first electrode blocks are distributed at intervals along a column direction, the adapter bridge is connected to two adjacent first electrode blocks; the second touch electrodes are distributed at intervals along the column direction, the second touch electrode includes a plurality of second electrode blocks connected in series along the row direction; the adapter bridge and the second touch electrode are intersected; the first electrode blocks and the second electrode are located at a same electrode layer, the adapter bridge is located at a side of the electrode layer, and an insulating layer is arranged between the adapter bridge and the electrode layer;

each of the first touch electrode and the second touch electrode is a grid-shaped structure formed by a plurality of grid lines, a grid line of the adapter bridge is an adapter line, and a grid line of the first electrode block and a grid line of the second electrode block are channel lines; and at least a side of the adapter bridge is connected to a guide portion disposed on the same layer as the adapter bridge;

in the adapter bridge, the first electrode block connected to the adapter bridge and the second touch electrode intersected with the adapter bridge, the guide portion overlaps with at least one channel line of a boundary of one of the first electrode block and the second touch electrode, a part of the adapter line overlaps with a part of a channel line of a boundary of at least one of the first electrode block or the second touch electrode; and an adapter line connected to the guide portion overlaps with a part of the channel line of the boundary of one of the first electrode block and the second touch electrode;

in the guide portion and the channel line that are overlapped, an extension direction of the guide portion is the same as an extension direction of the channel line, and at least partial edge of an orthographic projection of the guide portion on the display substrate is located outside an edge of an orthographic projection of the channel line on the display substrate;

in the adapter bridge and the first electrode block connected to the adapter bridge:

the adapter bridge is connected to the first electrode block through a plurality of via holes running through the insulating layer;

a region where the channel lines of the first electrode block are intersected is a channel intersection region, a region where the adapter lines are intersected is an adapter intersection region, a boundary of the first electrode block is provided with a plurality of the channel intersection regions, and the channel intersection regions of the boundary of the first electrode block and at least a part of the adapter intersection regions are overlapped in one-to-one correspondence;

in the adapter intersection region and the channel intersection region that are overlapped on the boundary of the first electrode block, a boundary of an orthographic projection of the adapter intersection region on the display substrate is located outside a boundary of an orthographic projection of the channel intersection region on the display substrate.

In an embodiment of the present disclosure, a plurality of channel lines overlapped with the guide portion are provided, the guide portion includes a plurality of guide lines, the plurality of guide lines are sequentially connected along an extension direction of a channel line corresponding to the guide portion towards a direction away from the adapter bridge, and the guide line overlaps with the channel line.

In an embodiment of the present disclosure, one guide line of the guide lines of the guide portion furthest from the adapter bridge overlaps with a portion of the channel line that is discontinuously arranged into two portions.

In an embodiment of the present disclosure, one guide line of the guide lines of the guide portion furthest from the adapter bridge overlaps with a portion of the channel line that is discontinuously arranged into two portions, one portion of the channel line that is discontinuously arranged into the two portions belongs to the first touch electrode, and the other portion belongs to the second touch electrode.

In an embodiment of the present disclosure, the grid-shaped structure is defined with a plurality of meshes, the mesh of the electrode layer is surrounded by the plurality of channel lines, and the channel intersection region forms a vertex of the mesh;

in the adapter bridge and the first electrode block connected to the adapter bridge:

the plurality of via holes are provided, the plurality of via holes are provided are located at the plurality of channel intersection regions of the same mesh, respectively; at most a part of the via holes are located on the boundary of the first electrode block;

the adapter intersection region where at least one via hole located at the boundary of the first electrode block is located is connected to an end, connected to the adapter bridge, of the guide portion.

In an embodiment of the present disclosure, in the adapter bridge, the first electrode block connected to the adapter bridge and the second touch electrode intersected with the adapter bridge, two sides of the adapter bridge are connected to guide portions overlapped with the boundary of the first electrode block, and two of the guide portions overlapped with the boundary of the first electrode block are connected through at least one adapter line; the boundary of the first electrode block is connected at a region between the two guide portions through at least one channel line, and the channel line overlaps with the adapter line between the two guide portions;

in the adapter line and the channel line that are overlapped, an extension direction of the adapter line is the same as an extension direction of the channel line, and an edge of an orthographic projection of the adapter line on the display substrate is located outside an edge of an orthographic projection of the channel line on the display substrate.

In an embodiment of the present disclosure, in the adapter bridge, the first electrode block connected to the adapter bridge and the second touch electrode intersected with the adapter bridge, two sides of the adapter bridge are connected to guide portions overlapped with the boundary of the first electrode block, and two of the guide portions overlapped with the boundary of the first electrode block are connected through at least one adapter line, and the boundary of the first electrode block is discontinuously arranged at a region between the two guide portions.

In an embodiment of the present disclosure, in the adapter bridge, the first electrode block connected to the adapter bridge and the second touch electrode intersected with the adapter bridge, a part of the adapter lines overlap with a boundary of the second touch electrode, and the adapter lines overlapped with the channel line of the boundary of the second touch electrode are sequentially connected along an extension direction of the boundary of the second touch electrode;

in the adapter line and the channel line that are overlapped, an extension direction of the adapter line is the same as an extension direction of the channel line, and an edge of an orthographic projection of the adapter line on the display substrate is located outside an edge of an orthographic projection of the channel line on the display substrate.

In an embodiment of the present disclosure, an orthographic projection of a boundary of the second touch electrode on the display substrate is discontinued at two sides of an orthographic projection of the adapter bridge on the display substrate.

In an embodiment of the present disclosure, an orthographic projection of a partial region of the boundary of the second touch electrode on the display substrate is located within a boundary of the orthographic projection of the adapter bridge on the display substrate.

In an embodiment of the present disclosure, in the adapter line and the channel line that are overlapped, a distance between an edge of an orthographic projection of the adapter line on the display substrate and the edge of the orthographic projection of the channel line on the display substrate is 0.9 μm to 1.5 μm.

In an embodiment of the present disclosure, in the guide portion and the channel line that are overlapped, a distance between the edge of the orthographic projection of the guide portion on the display substrate and the edge of the orthographic projection of the channel line on the display substrate is 0.9 μm to 1.5 μm.

In an embodiment of the present disclosure, in the adapter intersection region and the channel intersection region that are overlapped, a distance between an edge of the orthographic projection of the adapter intersection region on the display substrate and an edge of the orthographic projection of the channel intersection region on the display substrate is 0.9 μm to 1.5 μm.

According to a second aspect of the present disclosure, a touch structure is provided and is arranged on a side of a display substrate, where the touch structure includes a plurality of first touch electrodes and a plurality of second touch electrodes, the first touch electrodes are distributed at intervals along a row direction, the first touch electrode includes a plurality of first electrode blocks and an adapter bridge, the plurality of first electrode blocks are distributed at intervals along a column direction, the adapter bridge is connected to two adjacent first electrode blocks; the second touch electrodes are distributed at intervals along the column direction, the second touch electrode includes a plurality of second electrode blocks connected in series along the row direction; the adapter bridge and the second touch electrode are intersected; the first electrode blocks and the second electrode are located at a same electrode layer, the adapter bridge is located at a side of the electrode layer, and an insulating layer is arranged between the adapter bridge and the electrode layer;

each of the first touch electrode and the second touch electrode is a grid-shaped structure formed by a plurality of grid lines, a grid line of the adapter bridge is an adapter line, and a grid line of the first electrode block and a grid line of the second electrode block are channel lines;

in the adapter bridge, the first electrode block connected to the adapter bridge and the second touch electrode intersected with the adapter bridge, a part of the adapter line overlaps with a part of a channel line of a boundary of at least one of the first electrode block or the second touch electrode;

in the adapter line and the channel line that are overlapped, an extension direction of the adapter line is the same as an extension direction of the channel line, and an edge of an orthographic projection of the adapter line on the display substrate is coincident with an edge of an orthographic projection of the channel line on the display substrate;

an orthographic projection of a boundary of the second touch electrode on the display substrate is discontinued at two sides of an orthographic projection of the adapter bridge on the display substrate;

in the adapter bridge and the first electrode block connected to the adapter bridge:

the adapter bridge is connected to the first electrode block through a plurality of via holes running through the insulating layer;

a region where the channel lines of the first electrode block are intersected is a channel intersection region, a region where the adapter lines are intersected is an adapter intersection region, a boundary of the first electrode block is provided with a plurality of the channel intersection regions, and the channel intersection regions of the boundary of the first electrode block and at least a part of the adapter intersection regions are overlapped in one-to-one correspondence;

in the adapter intersection region and the channel intersection region that are overlapped on the boundary of the first electrode block, a boundary of an orthographic projection of the adapter intersection region on the display substrate is located outside a boundary of an orthographic projection of the channel intersection region on the display substrate.

In an embodiment of the present disclosure, an orthographic projection of a partial region of the boundary of the second touch electrode on the display substrate is located within a boundary of the orthographic projection of the adapter bridge on the display substrate.

According to a third aspect of the present disclosure, a touch display panel is provided and includes a display substrate; and any one of the above touch structure, where the adapter bridge is arranged on a side of the display substrate, the insulating layer covers the adapter bridge, and the electrode layer is arranged on a surface of the insulating layer away from the display substrate.

According to a fourth aspect of the present disclosure, a display device is provided and includes any one of the above touch display panel.

It should be noted that the above general description and the following detailed description are merely exemplary and explanatory and should not be construed as limiting of the present disclosure.

BRIEF DESCRIPTION OF THE DRAWINGS

The drawings here are incorporated into the specification and constitute a part of the specification, show embodiments in consistent with the present disclosure, and are used together with the specification to explain principles of the present disclosure. Obviously, the drawings in the following description are only some embodiments of the present disclosure. For those of ordinary skill in the art, other drawings can be obtained based on these drawings without creative work.

DETAILED DESCRIPTION

Figure 1:
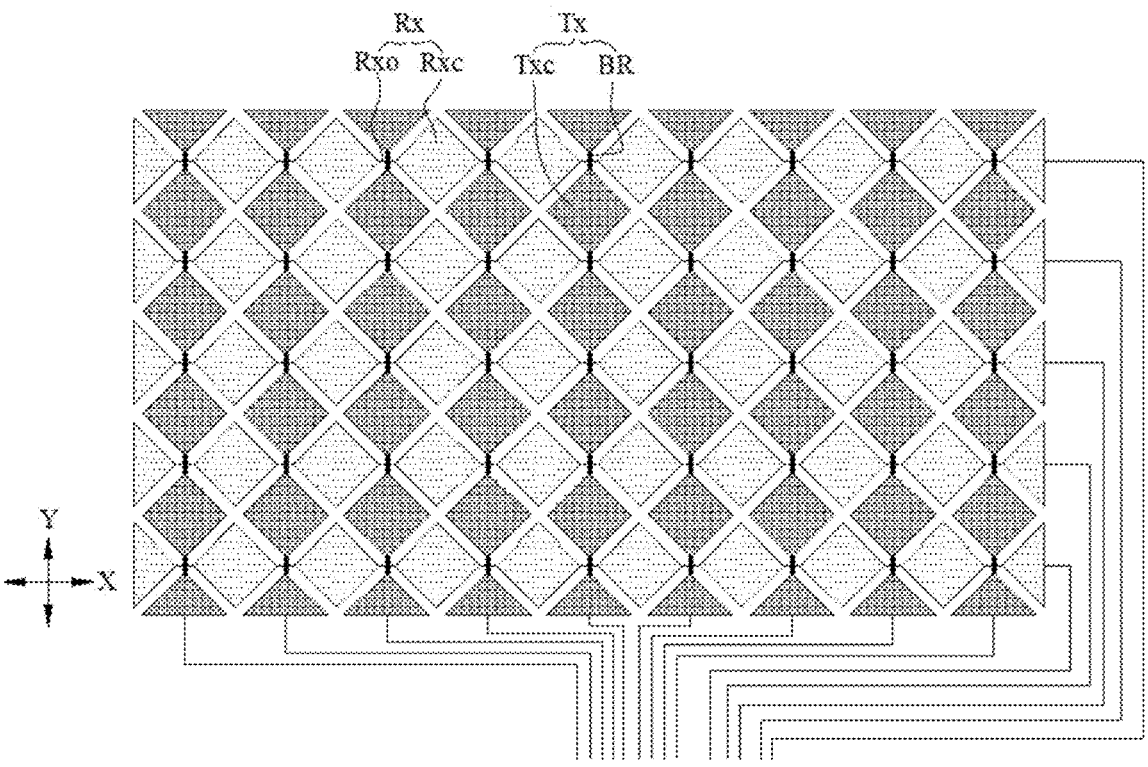
FIG. 1 is a top view of an embodiment of a touch structure of the present disclosure.

Embodiments will now be described more fully with reference to the drawings. However, the embodiments can be implemented in a variety of forms and should not be construed as being limited to examples set forth herein; rather, these embodiments are provided such that the present disclosure will be more full and complete so as to convey the idea of the embodiments to those skilled in this art. The same reference signs in the drawings denote the same or similar structures, and the detailed description thereof will be omitted. In addition, the drawings are merely schematic representations of the present disclosure and are not necessarily drawn to scale.

Although overlapping terms, such as "upper" and "lower", as used herein, are directed to describe the overlapping relationship between one component and another component of an icon. These terms are used herein for convenience only, for example, according to the direction of the illustrative examples as shown in the drawings. It should be understood that if the device is turned upside down, the component indicated as being the "upper" side would become the component on the "lower" side. When one structure is "on" another structure, it is possible to indicate that the structure is integrally formed on the other structure, or one structure is "directly" disposed on the other structure, or one structure is "indirectly" disposed on the other structure through a further structure.

The terms "one", "a", "the", "said", and "at least one" are used to indicate that there are one or more elements/components or the like; the terms "include" and "have" are used to indicate an open meaning of including and means that there may be additional elements/components/etc. in addition to the listed elements/components/etc.; and the terms "first", "second" and "third" etc. are used only as markers, and do not limit the number of objects.

A row direction X and a column direction Y herein merely refer to two directions perpendicular to each other. In the drawings of the present disclosure, the row direction X may be horizontal and the column direction Y may be vertical, which is not limited thereto. If a touch structure rotates, actual orientations of the row direction X and the column direction Y may change. The X direction in the figure exemplarily shows the row direction, and the Y direction exemplarily shows the column direction. Moreover, A and B described herein as "adjacent" means that there is no other A or B between A and B. For example, a first electrode block and a second electrode block that are adjacent means that no other first electrode block or no other second electrode block is arranged between the first electrode block and the second electrode block.

Embodiments of the present disclosure provide a touch structure, arranged on a side of a display substrate. The display substrate may be used to display an image, which may be an organic electroluminescent organic light-emitting display substrate, a liquid crystal display substrate or other device capable of displaying the image, which is not specially limited herein. The display touch structure may be used to sense a touch operation, determine a touch position, and display a corresponding image on the display substrate.

Figure 2:
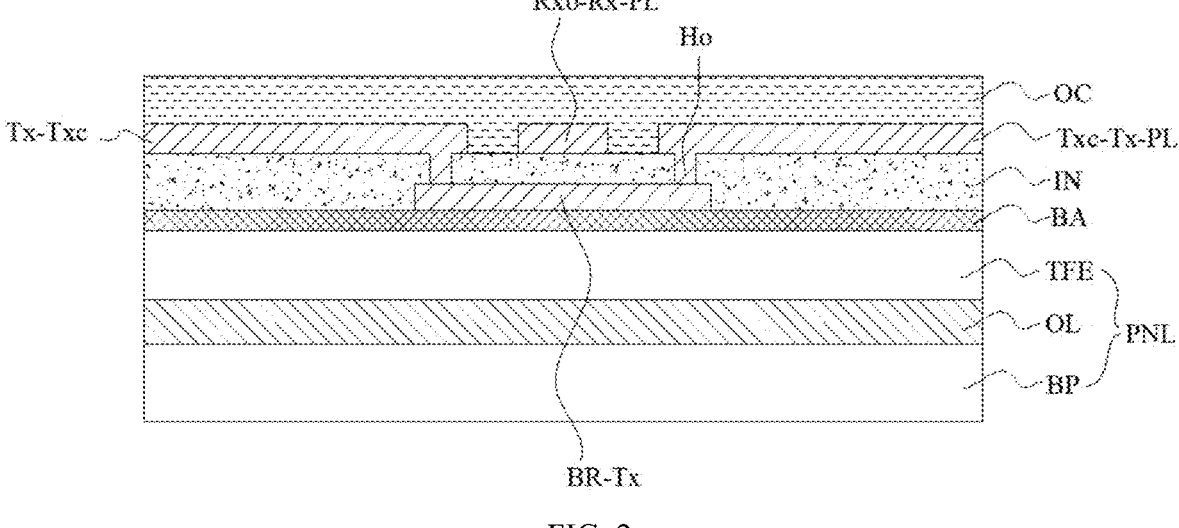
FIG. 2 is a partial sectional view of an embodiment of a touch display panel of the present disclosure.
Figure 3:
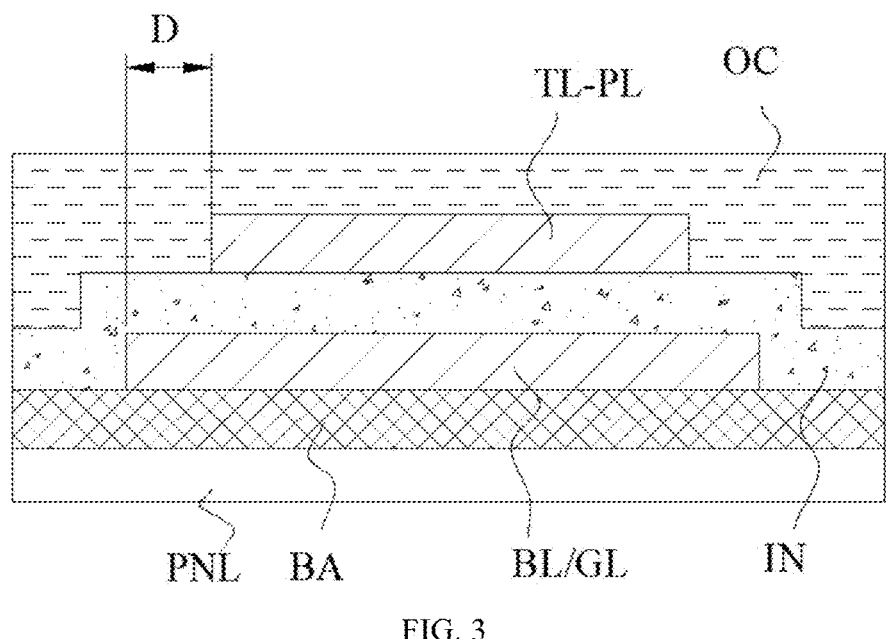
FIG. 3 is a partial sectional view of an embodiment of a touch structure of the present disclosure.

As shown in FIG. 1 and FIG. 2, the touch structure of the present disclosure may be a mutual capacitive structure, which may include a plurality of first touch electrodes Tx and a plurality of second touch electrodes Rx, the first touch electrodes Tx may be distributed at intervals along a row direction X, the second touch electrodes Rx may be distributed at intervals along a column direction Y. As shown in FIG. 1, both the first touch electrode Tx and the second touch electrode Rx may include a plurality of electrode blocks arranged in series, any first touch electrode Tx may include a plurality of first electrode blocks Txc arranged in series along the column direction Y, and two adjacent first electrode blocks Txc are connected in series through an adapter bridge BR. Any second touch electrode Rx may include a plurality of second electrode blocks Rxc arranged in series along the row direction X, and adjacent two second electrode blocks Rxc may be connected in series through a connection portion Rxo.

Each first electrode block Txc and each second electrode block Rxc are arranged in an array. At least a part of the first electrode blocks Txc are arranged adjacent to different second electrode blocks Rxc in two different directions intersecting with the row direction X and the column direction Y. Accordingly, at least a part of the second electrode blocks Rxc are arranged adjacent to different first electrode blocks Txc in two different directions intersecting with the row direction X and the column direction Y.

There is a gap between the first electrode block Txc and the second electrode block Rxc adjacent to each other, which may form the capacitance. In order to increase a region directly facing between the first electrode block Txc and the second electrode block Rxc that are adjacent to each other, an edge of the first electrode block Txc and an edge of the second electrode block Rxc may be provided with forked fingers FI distributed at intervals along a circumferential direction. In the first electrode block Txc and the second electrode block Rxc adjacent to each other, a part of the forked fingers FI of the first electrode block Txc may be located between a part of the forked fingers FI of the second electrode block Rxc, but not in contact with each other, such that the part of the forked fingers FI of the first electrode block Txc and the part of the forked fingers FI of the second electrode block Rxc are arranged at alternate intervals. An extension track of the gap between the first electrode block Txc and the second electrode block Rxc is more tortuous through the forked fingers FI enables, so as to increase the direct facing region of the two without increasing an area of the first electrode block Txc and an area of the second electrode block Rxc, which is conductive to increasing the capacitance between the two and improving the sensitivity of the sensing touch operation The capacitance may be formed between any adjacent first electrode block Txc and the second electrode block Rxc. The capacitance of the touch position may be changed when the finger performs the touch operation, the touch position may be determined by the first touch electrode Tx and the second touch electrode Rx corresponding to the amount of change in sensing capacitance, and a detailed principle is not described herein.

As shown in FIG. 1, each first touch electrode Tx may be connected to different signal terminals through different leads, and each second touch electrode Rx may also be connected with different signal terminals through different leads, so as to receive and send signals through the first touch electrode Tx and the second touch electrode Rx. For example, the first touch electrode Tx may serve as a driving electrode for receiving a driving signal, and the second touch electrode Rx may serve as a sensing electrode to output a sensing signal. In addition, functions of the first touch electrode Tx and the second touch electrode Rx may be interchanged.

As shown in FIGS. 1 and 2, the above electrode blocks and the connection portions Rxo may be located in the same electrode layer PL, which may be formed simultaneously through a single patterning process, and that is, the electrode layer PL includes electrode blocks of the first touch electrode Tx and the second touch electrode Rx. In order to avoid short circuit between the first touch electrode Tx and the second touch electrode Rx, the adapter bridge BR may be located on a side of the electrode layer PL, and that is, the adapter bridge BR is located at a layer different from the electrode layer PL. Moreover, the adapter bridge BR and the electrode layer PL may be separated by an insulating layer IN, the first touch electrode Tx and the second touch electrode Rx may be intersected at the adapter bridge BR, and further, the adapter bridge BR and the connection portion Rxo may be intersected. In addition, the adapter bridge BR may be connected with the first electrode block Txc through a via hole Ho running through the insulating layer IN.

As shown in FIG. 1 to 2, in some embodiments of the present disclosure, each adapter bridge BR may be arranged on a light-emitting side of the display substrate PNL and may be formed simultaneously. Each adapter bridge BR has the same thickness and is made of the same material, such that it may be formed simultaneously. The insulating layer IN may cover each adapter bridge BR, and bulge at a position corresponding to the adapter bridge BR without being disconnected. That is, the insulating layer IN may rise and fall with the existence of the adapter bridge BR. The electrode layer PL may be arranged on a surface of the insulating layer IN away from the display substrate PNL, and each bridge BR may be connected with the same first electrode block Txc through one or a plurality of via holes Ho running through the insulating layer IN.

Figure 4:
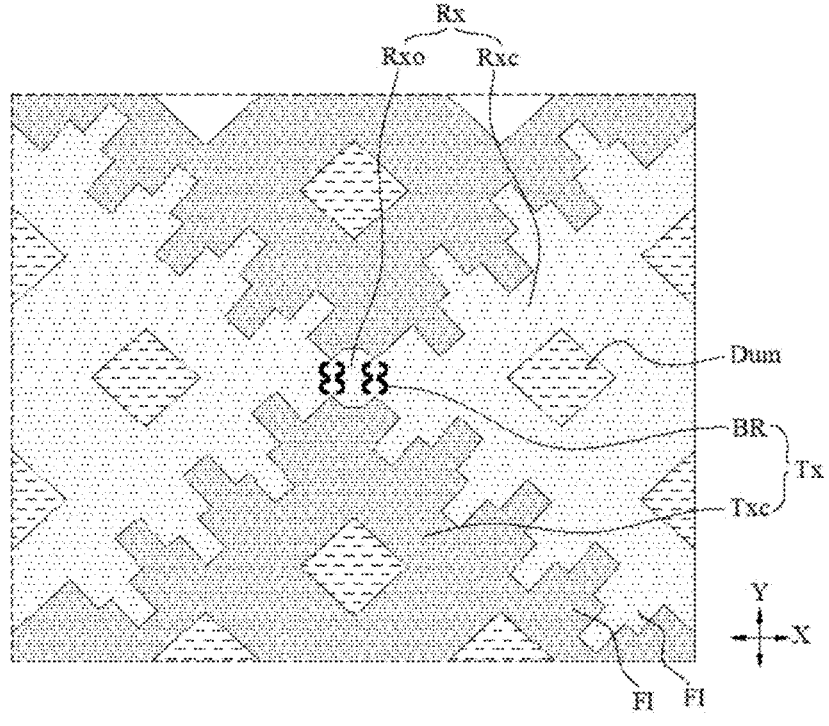
FIG. 4 is a partial enlarged view of an embodiment of a touch structure of the present disclosure.

As shown in FIG. 4, in the same first touch electrode Tx, there may be one or a plurality of the adapter bridges BR connected between two adjacent first electrode blocks Txc, and if the plurality of the adapter bridges BR are provided, the plurality of the adapter bridges BR may be distributed side by side along the row direction X, and each adapter bridge BR is intersected with the same connection portion Rxo in space. That is, orthographic projections of the two on the display substrate PNL are intersected without being actually connected, so as to prevent the short circuit caused by the connection of the first touch electrode Tx and the second touch electrode Rx.

In some embodiments of the present disclosure, both the first electrode block Txc and the second electrode block Rxc may be embedded with a dummy electrode Dum. For example, the first electrode block Txc and the second electrode block Rxc are defined with hollow regions, and the hollow region is a through-hole structure running through the electrode layer. The dummy electrode Dum is located in the hollow region, and is arranged on the same layer as the first electrode block Txc and the second electrode block Rxc. Each hollow region may be provided with one dummy electrode Dum, and each dummy electrode Dum is in a floating connection state, i.e., not electrically connected to any other structure and not receiving any electrical signal.

Each of the adapter bridge BR and the electrode layer PL may be a single-layer conductive structure or a multi-layer conductive structure. For example, the adapter bridge BR may include two outer layers and an intermediate layer located between the two outer layers. A material of the outer layer may be titanium, and a material of the intermediate layer may be aluminum, and that is, the adapter bridge BR is a Ti/Al/Ti structure. Alternatively, a material of the outer layer may be indium tin oxide (ITO), and a material of the intermediate layer may be aluminum, and that is, the adapter bridge BR is ITO/Ag/ITO structure. If the electrode layer PL is the multilayer structure, it may also be Ti/Al/Ti structure, ITO/Ag/ITO structure.

A material of the insulating layer IN may be silicon nitride, but in addition, it may also be silicon oxide, silicon nitride or other insulating material.

In addition, as shown in FIG. 2, in some embodiments of the present disclosure, the touch structure may also include a buffer layer BA and a protective layer OC. The buffer layer BA may serve as a substrate of the touch structure, which may be arranged on the light-emitting side of the display substrate PNL, and the material of the buffer layer BA may include silicon nitride, silicon oxide and other insulating material. The adapter bridge BR may be arranged on the surface of the buffer layer BA away from the display substrate PNL. The protective layer OC may cover the region of the electrode layer PL and the insulating layer IN that are not covered by the electrode layer PL. The protective layer OC is used to protect the electrode layer PL, and the material of the protective layer may be polyimide (PI) or optical adhesive and other transparent insulating material.

As shown in FIGS. 5 to 11, in order to reduce the blocking of the light emitted by the display substrate PNL, the electrode layer PL where the first touch electrode Tx and the second touch electrode Rx are located may be made into a grid-shaped structure formed by a plurality of grid lines. Each grid line may extend along a straight line, but the direction may be different. The grid line of the electrode layer PL (including the first electrode block Txc and the second touch electrode Rx) may serve as a channel line TL, and the grid line of the adapter bridge BR may serve as an adapter line BL. The aforementioned grid-shaped structure is defined with a plurality of meshes NEh, and each mesh NEh is surrounded by a plurality of grid lines. For example, any mesh NEh of the electrode layer PL may be surrounded by a plurality of channel lines TL, and any mesh NEh of the adapter bridge BR may be surrounded by a plurality of adapter lines BL. The mesh NEh may have a shape of a polygon, such as a diamond or a hexagon, which is not limited herein, and each side of the polygon is one grid line. In addition, the dummy electrode Dum may also be a grid-shaped structure and may be formed simultaneously with the first electrode block Txc and the second touch electrode Rx.

It should be noted that due to a width of the grid line, the aforementioned polygon is not limited to a polygon with a shape in standard geometry, and a vertex of the polygon is not a point in a geometric sense, but rather refers to a region where the grid lines are intersected.

As shown in FIG. 5 to FIG. 11, in some embodiments of the present disclosure, a region where the channel lines TL of the first electrode block Txc are intersected is a channel intersection region TLm, a region where different adapter lines BL of the adapter bridge BR are intersected is an adapter intersection region BRm. A boundary of the first electrode block Txc is provided with a plurality of the channel intersection regions TLm, and the channel intersection regions TLm of the boundary of the first electrode block Txc and at least a part of the adapter intersection regions BRm are overlapped in one-to-one correspondence. An orthographic projection of the adapter intersection region BRm and an orthographic projection of the channel intersection region TLm on the display substrate PNL at least partially coincide, where the adapter intersection region BRm and the channel intersection region TLm are overlapped, and the adapter intersection region BRm and the channel intersection region TLm that are overlapped may be connected through a via hole Ho.

The channel intersection region TLm may be a region where two channel lines TL are intersected, or may extend outwardly on the bases on the channel lines TL, so as to increase an area of the intersection region. A shape of the channel intersection region TLm is not specially limited herein. A form of the adapter intersection region BRm is similar to that of the channel intersection region TLm, a shape of which is not specially limited herein. An area of the adapter intersection region BRm and the channel intersection region TLm that are connected through the via hole Ho is not less than that of other the adapter intersection region BRm and the channel intersection region TLm, so as to accommodate the via hole Ho.

In the adapter intersection region BRm and the channel intersection region TLm that are overlapped at the boundary of the first electrode block Txc, a boundary of an orthographic projection of the adapter intersection region BRm on the display substrate PNL is located outside a boundary of an orthographic projection of the channel intersection region TLm on the display substrate PNL.

Figure 5:
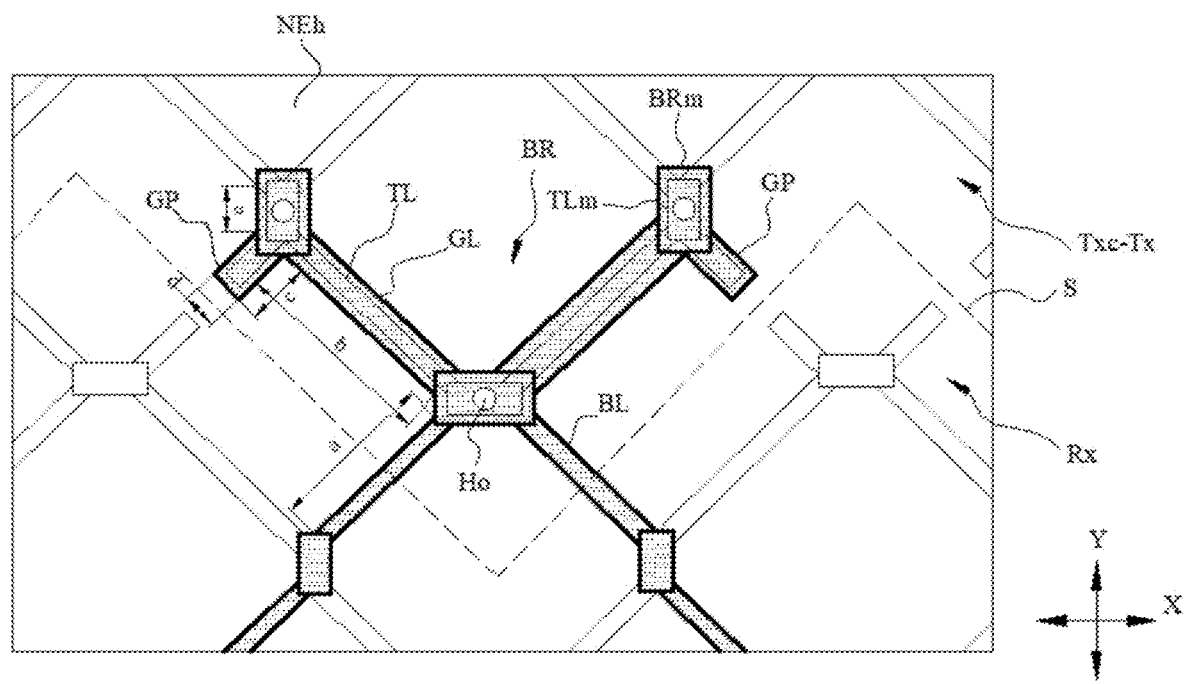
FIG. 5 is a partial schematic diagram of a first embodiment of a touch structure of the present disclosure.
Figure 6:
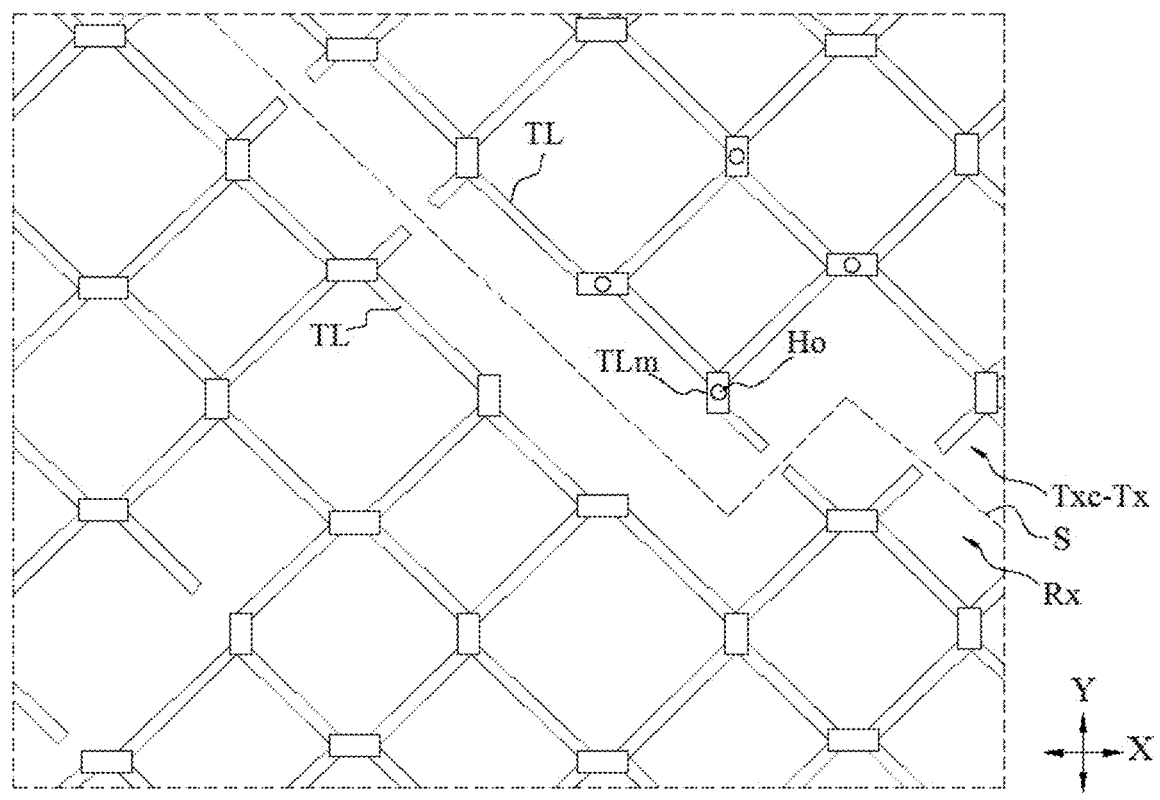
FIG. 6 is a partial schematic diagram of an electrode layer of a second embodiment of the touch structure of the present disclosure.

As shown in FIG. 5 to FIG. 11, the electrode layer PL is disconnected at a part of the channel line TL, thereby dividing into the first electrode block Txc and the second touch electrode Rx, and that is, a gap between the first electrode block Txc and the second touch electrode Rx that are adjacent to each other may be formed by the disconnection of the channel line TL. A way to disconnect at a channel line TL may be to remove a partial region of the channel line TL or to remove the entire channel line TL. FIG. 5-FIG. 1 use a dotted line S to illustrate an extension path of the gap between the first electrode block Txc and the second electrode Rx, the extension path is only a schematic illustration and is not construed as a limitation to an actual extension path.

The gap between the first electrode block Txc and the second touch electrode Rx adjacent to the first electrode block Txc may be formed by the above two disconnection ways. The boundary of the first electrode block Txc and the boundary of the second touch electrode Rx may be formed by a part of the channel line TL. That is, a channel line TL on the outermost side of the first electrode block Txc is the boundary of the first electrode block Txc, and a channel line TL on the outermost side of the second touch electrode Rx is the boundary of the second touch electrode Rx. The boundary of the second touch electrode Rx includes a boundary of the second electrode block Rxc and a boundary of the connection portion Rxo.

In the adapter bridge, the first electrode block connected to the adapter bridge and the second touch electrode intersected with the adapter bridge, the adapter bridge BR is connected with the first electrode block Txc by straddling the second touch electrode Rx and the gap between the second touch electrode Rx and the first electrode block Txc. A width of the gap straddled by the adapter bridge BR may be equal to a length of the first adapter line BL, and the adapter bridge BR is provided with a plurality of adapter lines BL corresponding to the gap. That is, an orthographic projection of a part of the adapter lines BL of the adapter bridge BR on the display substrate PNL is located within an orthographic projection of the gap between the first electrode block Txc and the second touch electrode Rx on the display substrate PNL, such that the adapter bridge BR may straddle the second touch electrode Rx in space to be connected with the first electrode block Txc.

In some embodiments of the present disclosure, in the adapter bridge, the first electrode block connected to the adapter bridge and the second touch electrode intersected with the adapter bridge, the adapter line BL, extending into the boundary of the first electrode block Txc, of the adapter bridge BR may overlap with the channel line TL of the first electrode block Txc in one-to-one correspondence, and a part of the adapter line BL may overlap with the channel line TL constituting the boundary of the first electrode block Txc.

In some embodiments of the present disclosure, in the adapter bridge, the first electrode block connected to the adapter bridge and the second touch electrode intersected with the adapter bridge, the adapter line BL, extending into the boundary of the second touch electrode Rx, of the adapter bridge BR may overlap with the channel line TL of the second touch electrode Rx in one-to-one correspondence, and a part of the adapter line BL may overlap with the channel line TL constituting the boundary of the second touch electrode Rx. The orthographic projections of the overlapped adapter line BL and the channel line TL on the display substrate PNL extend in the same direction, and at least partially coincide with each other.

The following is an example illustration for the distribution of the mesh NEh in combination with a basic structure of the display substrate PNL:

The display substrate PNL may be provided with a plurality of light-emitting units, each light-emitting unit may include a plurality of sub-pixels that emit light independently, and the same light-emitting unit at least includes a plurality of sub-pixels with different light-emitting colors. Each of the above meshes NEh may be arranged corresponding to the sub-pixel of the display substrate PNL. There is at least one sub-pixel in an orthographic projection of a mesh NEh on the display substrate PNL, and the light emitted by the sub-pixel may be emitted from the mesh NEh, thereby reducing the blocking of the touch structure on the light emitted by the display substrate PNL. For example, the display substrate PNL may be an electroluminescent organic light-emitting display substrate PNL, i.e., an OLED display substrate PNL, which may include a driving backplane BP and a light-emitting layer OL located on a side of the driving backplane BP. The light-emitting layer OL may include a plurality of light-emitting elements distributed in an array, and the light-emitting element may be an organic light-emitting diode. In some embodiments, each light-emitting element emits light independently, and the color of the light may be different, and one light-emitting element may serve as one sub-pixel. In some other embodiments, the light-emitting colors of the light-emitting elements are the same, and the display substrate PNL may also include a color film layer, and the color film layer may include a light filter portion in one-to-one correspondence with the light-emitting element, the light filter portion may only emit a monochromatic light, and the light filter portion and the light-emitting element corresponding to the light filter portion may serve as a sub-pixel.

It should be noted that the above light-emitting units are only assigned for the convenience of describing the distribution of the sub-pixels, and are not limited to be basic units for displaying the image. When displaying the image, each sub-pixel may be grouped into a plurality of pixels, and each pixel includes sub-pixels with at least three colors. Adjacent pixels may share some sub-pixels, and that is, one sub-pixel in the light-emitting unit may be shared by two different pixels, and the image display is achieved through the sub-pixel rendering (SPR) algorithm. In addition, different pixels may also not share the sub-pixel, and the light-emitting unit may serve as the pixel.

As shown in FIG. 5-FIG. 8, in some embodiments of the present disclosure, the display substrate PNL is an electroluminescent organic light-emitting display substrate PNL with sub-pixels arranged in a diamond. Specifically, the same light-emitting unit may include four sub-pixels, namely, one red sub-pixel, one blue sub-pixel and two green sub-pixels. The red sub-pixel and the blue sub-pixel may be distributed along the column direction Y, the blue sub-pixel is larger than the red sub-pixel, the two green sub-pixels are distributed on both sides of the red sub-pixel and the blue sub-pixel along the row direction X, and areas of the two green sub-pixels is equal. Central connection lines of the four sub-pixels may be in a rhombic shape, and a profile of each sub-pixel may also be in a rhombic shape, and an area of the green sub-pixel is less than an area of the red sub-pixel.

Accordingly, the mesh NEh of the touch structure may be in a rhombic shape, and each sub-pixel corresponds to only one mesh NEh, so as to emit light through the mesh NEh. A shape of any sub-pixel is the same as a shape of the mesh NEh corresponding to the sub-pixel. If both are in polygonal shapes, side edges of the sub-pixel are parallel to side edges of the mesh NEh (i.e., grid lines surrounding the mesh NEh) in one-to-one correspondence. A mesh NEh corresponding to the green sub-pixel is less than a mesh NEh corresponding to the red sub-pixel, and a mesh NEh corresponding to the blue sub-pixel is greater than the mesh NEh corresponding to the red sub-pixel.

In the adapter bridge BR and the first electrode block Txc connected to the adapter bridge BR, a number of via holes Ho connecting the adapter bridge BR and the first electrode block Txc is the same as a number of vertices of the mesh NEh, and each via hole Ho is located on the channel intersection region TLm and the adapter intersection region BRm at each vertex in one-to-one correspondence, with a part of the via holes Ho located on the boundary of the first electrode block Txc. For example, one or two via holes Ho are located on the boundary of the first electrode block Txc, while other via holes Ho are not located on the boundary of the first electrode block Txc.

Figure 9:
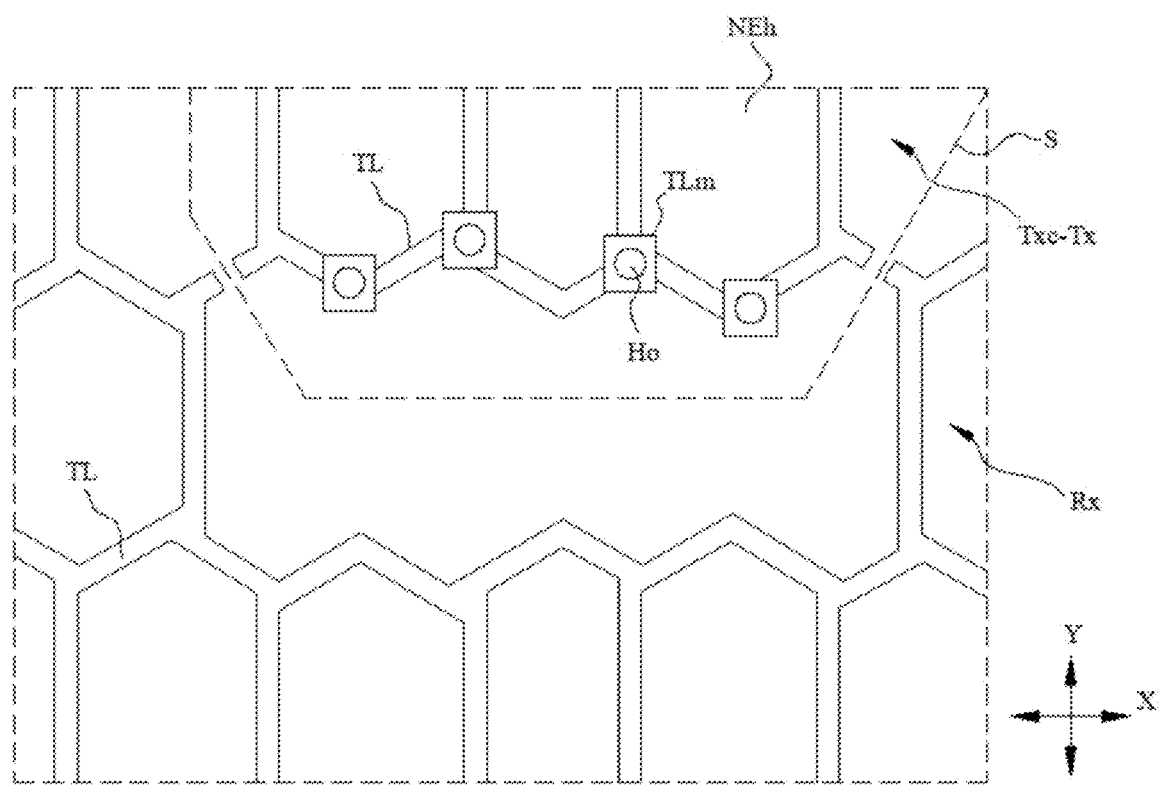
FIG. 9 is a partial schematic diagram of an electrode layer of a third embodiment of the touch structure of the present disclosure.
Figure 10:
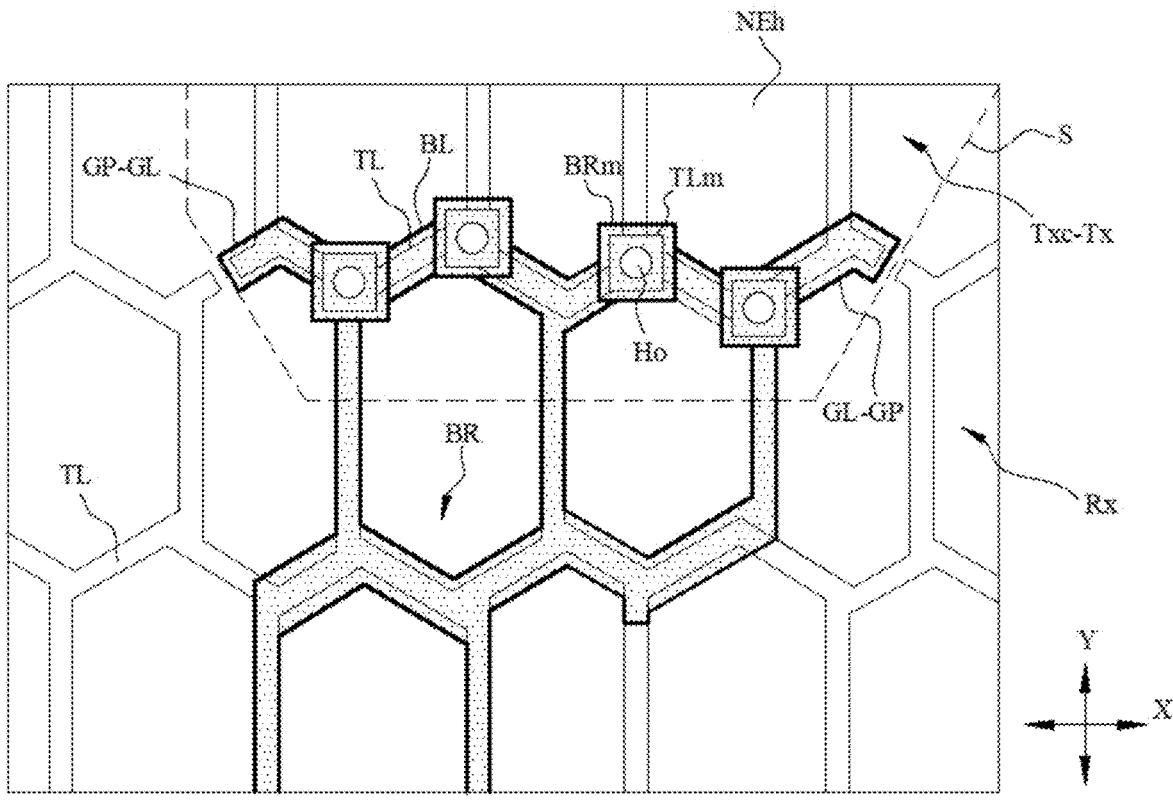
FIG. 10 is a partial schematic diagram of a third embodiment of a touch structure of the present disclosure.
Figure 11:
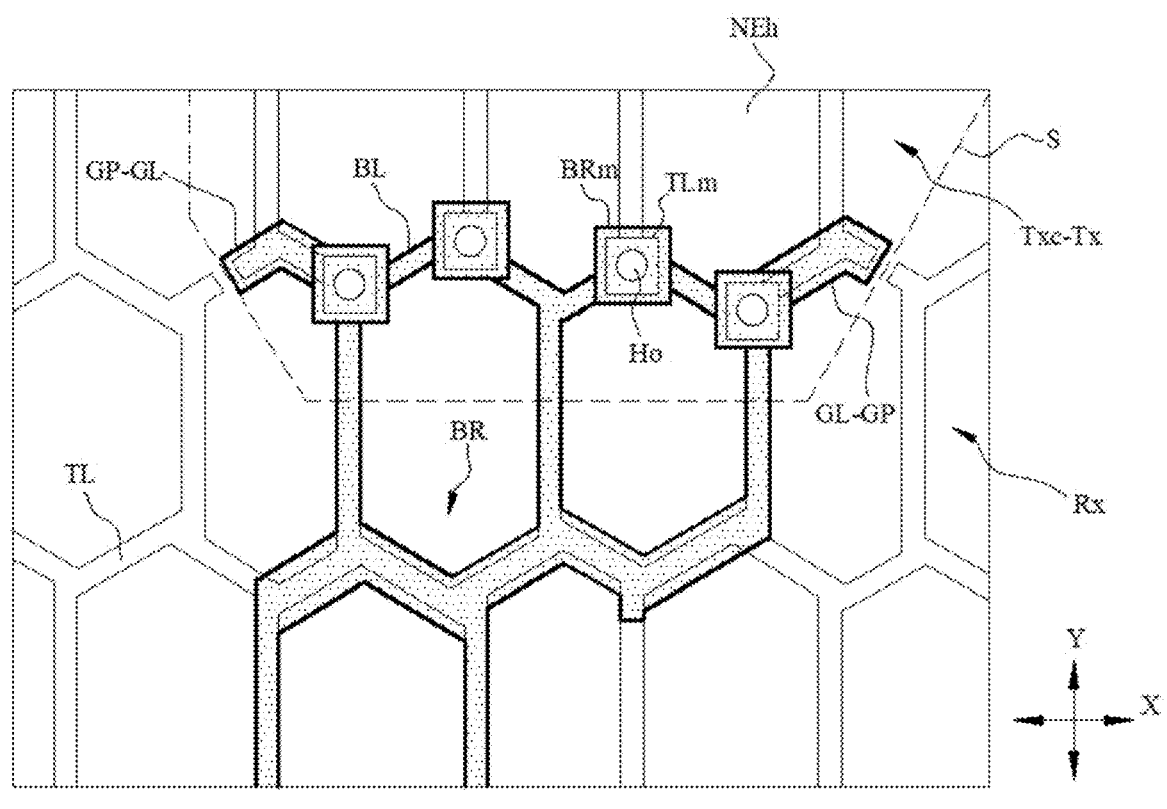
FIG. 11 is a partial schematic diagram of a fourth embodiment of a touch structure of the present disclosure.

As shown in FIG. 9 to FIG. 11, in some other embodiments of the present disclosure, the display substrate PNL is still an electroluminescent organic light-emitting display substrate PNL with sub-pixels arranged in a GGRB manner. Specifically, the same light-emitting unit may include four sub-pixels, namely, one red sub-pixel, one blue sub-pixel and two green sub-pixels. The red sub-pixel and the blue sub-pixel may be distributed along the row direction X, and both are in hexagonal shapes. An area of the blue sub-pixel is greater than that of the red sub-pixel, the two green sub-pixels are distributed between the red sub-pixel and the blue sub-pixel along the column direction Y, both of the two green sub-pixels are in pentagonal shapes with equal areas, and the area of the green sub-pixel is less than the area of the red sub-pixel or the area of the blue sub-pixel.

Accordingly, each sub-pixel corresponds to only one mesh NEh, so as to emit light through the mesh NEh. A shape of any sub-pixel is the same as a shape of the mesh NEh corresponding to the sub-pixel. If both are in polygonal shapes, side edges of the sub-pixel are parallel to side edges of the mesh NEh (i.e., grid lines surrounding the mesh NEh) in one-to-one correspondence. A mesh NEh corresponding to the green sub-pixel is less than a mesh NEh corresponding to the blue sub-pixel and a mesh NEh corresponding to the red sub-pixel, and the mesh NEh corresponding to the blue sub-pixel is less than the mesh NEh corresponding to the red sub-pixel.

In the adapter bridge BR and the first electrode block Txc connected to the adapter bridge BR, a plurality of via holes Ho are provided, such as four, five, and the like, and each via Ho is located on the boundary of the first electrode block Txc.

For the above touch structure, the inventor found that, in the process of forming the adapter bridge BR of the above touch structure, the adapter bridge may be made by processes such as deposition, exposure, development, etching and the like. In this process, a cross section of the adapter line BL is trapezoidal, that is, a side wall of the adapter line BL shrinks in a direction away from the display substrate PNL. Accordingly, the insulating layer IN forms a trapezoidal protrusion at a position corresponding to the side wall of the adapter line BL. The side wall of the protrusion is similar to the side wall of the adapter line BL and also shrinks away from the substrate. When forming the electrode layer PL, in addition to the required pattern, there is a residual material of the electrode layer PL on a position corresponding to an outside of the side wall of the protrusion, i.e., a position corresponding to the outside to the side wall of the adapter line BL, and the residual material may extend along the side wall of the adapter line BL, connecting the first electrode block Txc and the second touch electrode Rx adjacent to the first electrode block Txc and thus causing the short circuit, which results in touch abnormality such as touch failure or decreased accuracy and the like.

In this regard, the inventor proposes a touch structure based on the above implementation, as shown in FIG. 5 to FIG. 11. A guide portion GP one the same layer as the adapter bridge BR is arranged to be connected to at least one side of the adapter bridge BR, the guide portion GP guides an orientation of the residual material. In this way, the extension path of the residual material, causing the short circuit between the first electrode block Txc and the second touch electrode adjacent to the first electrode block, is extended such that the extension path is easily disconnected, thus reducing a risk of the short circuit. Since the adapter bridge BR extends from one first electrode block Txc to another first electrode block Txc in the same column, a side of the adapter bridge BR is the side of its extension direction. For example:

Each of the two sides of the adapter bridge BR is connected with the guide portion GP, and the guide portion GP may be connected with the adapter line BL of the adapter bridge BR at the adapter intersection region BRm. In the adapter bridge BR, the first electrode block Txc connected with the adapter bridge and the second touch electrode Rx intersected with the adapter bridge BR: a guide portion GP may overlap with a part of the channel line TL forming the boundary of the first electrode block Txc, or may overlap with a part of the channel line TL forming the boundary of the second touch electrode Rx. Alternatively, the same layer of the adapter bridge BR may be connected with two guide portions GP, one of the two guide portions overlaps with the part of the channel line TL forming the boundary of the first electrode block Txc, and the other one overlaps with the part of the channel line TL forming the boundary of the second touch electrode Rx.

In the guide portion and the channel line that are overlapped, an extension direction of the guide portion GP is the same as an extension direction of the channel line TL, and at least partial edge of an orthographic projection of the guide portion GP on the display substrate PNL is located outside an edge of an orthographic projection of the channel line TL on the display substrate PNL.

Since the guide portion GP and the adapter bridge BR are arranged on the same layer, i.e., thicknesses and materials of the two are the same, and may be formed simultaneously. In this way, the guide portion GP may be regarded as an extension of the adapter bridge BR. When the guide portion GP and the adapter bridge BR are formed, both cross sections of the guide portion GP and the adapter bridge BR may be trapezoidal, that is, side walls of the two shrink in a direction away from the display substrate PNL. However, since the edge of the orthographic projection of the guide portion GP on the display substrate PNL is located outside the edge of the orthographic projection of the channel line TL on the display substrate PNL, the residual material of the electrode layer PL extends only along the extension direction of the guide portion GP, and the residual material may connect the first electrode block Txc and the second touch electrode Rx adjacent to each other after bypassing an end of the guide portion GP away from the adapter bridge BR, the arrangement of the guide portion GP causes the path to be extended, which leads to the difficulty of continuous extension of the residual material and increases the possibility of the disconnection of the residual material. Thus, the short circuit caused by the residual material of the adjacent first electrode block Txc and the second touch electrode Rx is reduced and the risk of touch abnormality is also reduced.

As shown in FIG. 5, a length of the path that the residual material needs to pass through is a+b+c+d+e to bypass the guide portion GP and connect the first electrode block Txc and the second touch electrode Rx. Obviously, a+b+c+d+e is greater than a, compared with the arrangement without the guide portion GP, the path that causes the short circuit is extended at least on one side of the adapter bridge BR, thereby rendering it more difficult for the residual material to cause the short circuit.

Figure 7:
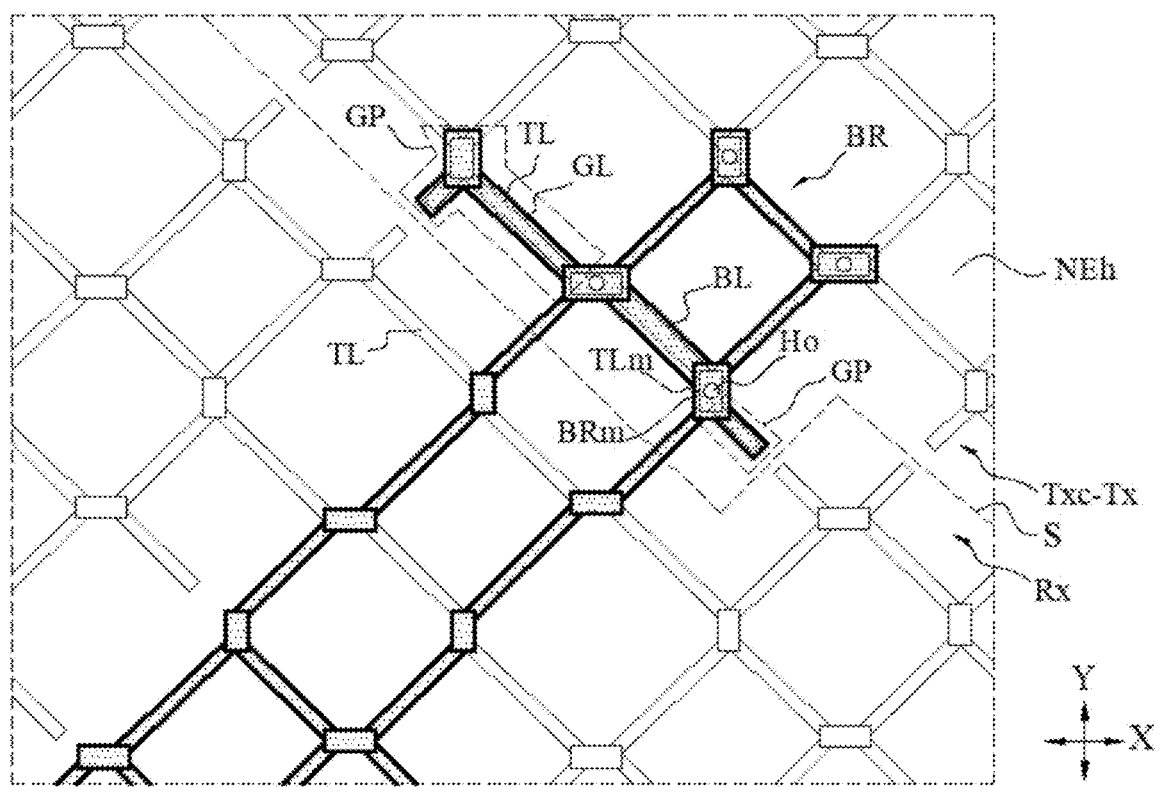
FIG. 7 is a partial schematic diagram of a second embodiment of a touch structure of the present disclosure.
Figure 8:
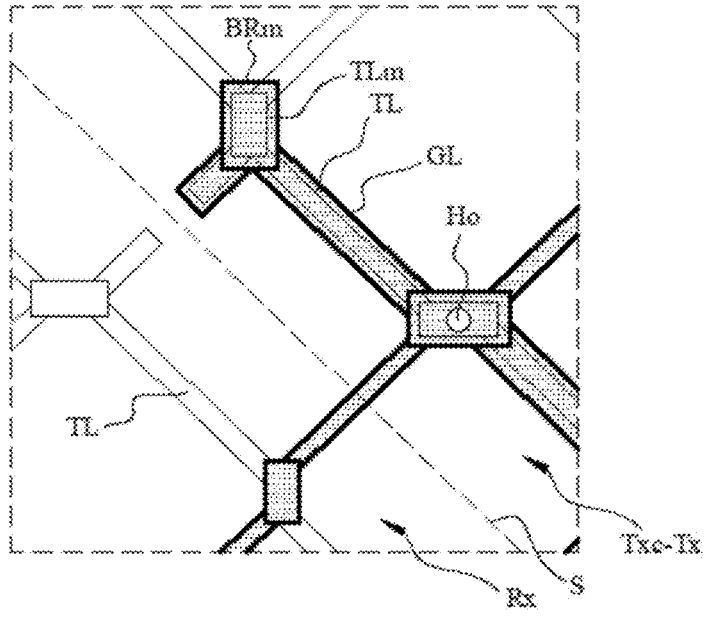
FIG. 8 is a partial enlarged view of FIG. 7.

In some embodiments of the present disclosure, as shown in FIGS. 7 and 8, a plurality of channel lines TL overlapped with the guide portion GP are provided, the guide portion GP includes a plurality of guide lines GL sequentially connected along an extension direction of a channel line TL corresponding to the guide portion towards a direction away from the adapter bridge BR, and the guide line GL overlaps with the channel line TL. In the guide line GL and the channel line TL that are overlapped, an edge of an orthographic projection of the guide line GL on the display substrate PNL is located outside an edge of an orthographic projection of the channel line TL on the display substrate PNL.

A guide line GL of the guide portion GP that is furthest from the adapter bridge BR overlaps with a portion of the channel line TL that is discontinuously arranged into two portions. For example, a guide portion GP may include two guide lines GL, and one guide line GL that is further from the adapter bridge BR overlaps with a portion of the channel line TL close to the guide portion GP, where the channel line TL is discontinuously arranged into two portions. It should be noted that the number of guide lines GL included in different guide portions GP may be different. In the channel line TL discontinuously arranged into two portions, one portion may belong to the first touch electrode Tx, and the other portion may be arranged at the second touch electrode Rx.

In some embodiments of the present disclosure, in the adapter bridge BR and the first electrode block Txc connected to the adapter bridge BR, a plurality of via holes Ho connecting the adapter bridge BR and the first electrode block Txc are provided, at least one via hole Ho is located on the boundary of the first electrode block Txc, the adapter intersection region BRm where the at least one via hole located at the boundary of the first electrode block Txc is located is connected to an end, connected to the adapter bridge BR, of the guide portion GP. That is, the guide portion GP starts from the adapter intersection region BRm where the via hole Ho is located and extends in a direction away from the adapter bridge BR. For example, if two via holes Ho are located at the boundary of the first electrode block Txc, two guide portions GP may respectively extend from the adapter intersection region BRm where the via hole Ho is located to the direction away from the adapter bridge BR. If the three via holes Ho are located at the boundary of the first electrode block Txc, two guide portions GP may extend from the adapter intersection region BRm where one of the outermost two via holes Ho is located to the direction away from the adapter bridge BR.

In some embodiments of the present disclosure, as shown in FIG. 5 to FIG. 10, in the adapter bridge BR, the first electrode block Txc connected to the adapter bridge BR and the second touch electrode Rx intersected with the adapter bridge BR, two sides of the adapter bridge BR are connected to guide portions GP overlapped with the boundary of the first electrode block Txc, and two guide portions GP overlapped with the boundary of the first electrode block Txc are connected through at least one adapter line BL; the boundary of the first electrode block Txc at a region between the two guide portions GP is connected through at least one channel line TL, and the channel line TL in the region overlaps with the adapter line BL between the two guide portions GP in one-to-one correspondence.

In the adapter line BL and the channel line TL that are overlapped, an extension direction of the adapter line BL is the same as an extension direction of the channel line TL, and an edge of an orthographic projection of the adapter line BL on the display substrate PNL is located outside an edge of an orthographic projection of the channel line TL on the display substrate PNL. Thus, the extendable path of the residual material of the electrode layer PL may be extended to the maximum extent through the two guide portions GP and the adapter line BL between the two, which increases the difficulty of the continuous extension of the residual material and makes it easy to disconnect, thus improving the ability to prevent the short circuit between the first electrode block Txc and the second touch electrode Rx.

In some embodiments of the present disclosure, as shown in FIG. 11, in the adapter bridge BR, the first electrode block Txc connected to the adapter bridge BR and the second touch electrode Rx intersected with the adapter bridge BR, two sides of the adapter bridge BR are connected to guide portions GP overlapped with the boundary of the first electrode block Txc, and two guide portions GP overlapped with the boundary of the first electrode block Txc are connected through at least one adapter line BL, and the boundary of the first electrode block Txc is discontinuously arranged at a region between the two guide portions GP. The discontinuous arrangement here may refer to that no channel line TL is provided here, which is equivalent to making the boundary of the first electrode block Txc recessed inwardly in the region between the two guide portions GP, thus increasing the distance from the second touch electrode Rx, and also increasing the difficulty of the continuity of the residual material, making it easy to disconnect, so as to improve the ability to prevent the short circuit between the first electrode block Txc and the second touch electrode Rx through the disconnection of the first electrode block Txc at the region between the two guide portions GP.

In some embodiments of the present disclosure, as shown in FIGS. 10 and 11, in the adapter bridge BR, the first electrode block Txc connected to the adapter bridge BR and the second touch electrode Rx intersected with the adapter bridge BR, a part of the adapter lines BL overlap with a boundary of the second touch electrode Rx, and the adapter lines BL overlapped with channel lines TL of the boundary of the second touch electrode Rx are sequentially connected along an extension direction of the boundary of the second touch electrode Rx. Moreover, in the adapter line BL and the channel line TL that are overlapped, an extension direction of the adapter line BL is the same as an extension direction of the channel line TL, and an edge of an orthographic projection of the adapter line BL on the display substrate PNL is located outside an edge of an orthographic projection of the channel line TL on the display substrate PNL. Thus, the residual material of the electrode layer PL may have a certain distance from the boundary of the second touch electrode Rx, so as to reduce the risk of the short circuit between the first electrode block Txc and the second touch electrode Rx caused by the connection of the residual material.

In some embodiments of the present disclosure, the boundary of the second touch electrode Rx may be discontinued at two sides of a region straddled by the adapter bridge BR, and that is, an orthographic projection of a boundary of the second touch electrode Rx on the display substrate PNL is discontinued at two sides of an orthographic projection of the adapter bridge BR on the display substrate PNL. It is equivalent to dividing the boundary of the second touch electrode Rx at two sides of the adapter bridge BR and the boundary having a certain distance from the adapter bridge BR, so as to increase the distance from the first electrode block Txc, and also increase the difficulty of the continuity of the residual material, making it easy to disconnect, which improves the ability to prevent the short circuit between the first electrode block Txc and the second touch electrode Rx.

Further, in order to maintain the uniformity of the boundary of the second touch electrode Rx, a part of the boundary of the second touch electrode Rx may be left within a range of the adapter bridge BR, such that an orthographic projection of a partial region of the boundary of the second touch electrode Rx on the display substrate PNL is located within a boundary of the orthographic projection of the adapter bridge BR on the display substrate PNL.

In the adapter line BL and channel line TL that are overlapped, a distance D between an edge of an orthographic projection of the adapter line BL on the display substrate PNL and the edge of the orthographic projection of the channel line TL on the display substrate PNL is too large, which may block the sub-pixel light emitting light. If the distance D is too small, it may be difficult to limit the position of the residual material of the electrode layer PL. After a lot of tests and analysis performed by the inventor, the distance D may be 0.9 μm-1.5 μm, such as 1.2 μm, which may prevent the short circuit while ensuring the light emitting effect. Those skilled in the art may adopt a smaller or larger value according to the actual situation.

Similarly, in the guide portion GP and the channel line TL that are overlapped, a distance between the edge of the orthographic projection of the guide portion GP on the display substrate PNL and the edge of the orthographic projection of the channel line TL on the display substrate PNL may also be 0.9 μm to 1.5 μm, such as 1.2 μm.

In the adapter intersection region BRm and the channel intersection region TLm that are overlapped, a distance between an edge of the orthographic projection of the adapter intersection region BRm on the display substrate PNL and an edge of the orthographic projection of the channel intersection region TLm on the display substrate PNL may be 0.9 μm to 1.5 μm, such as 1.2 μm.

Figure 12:
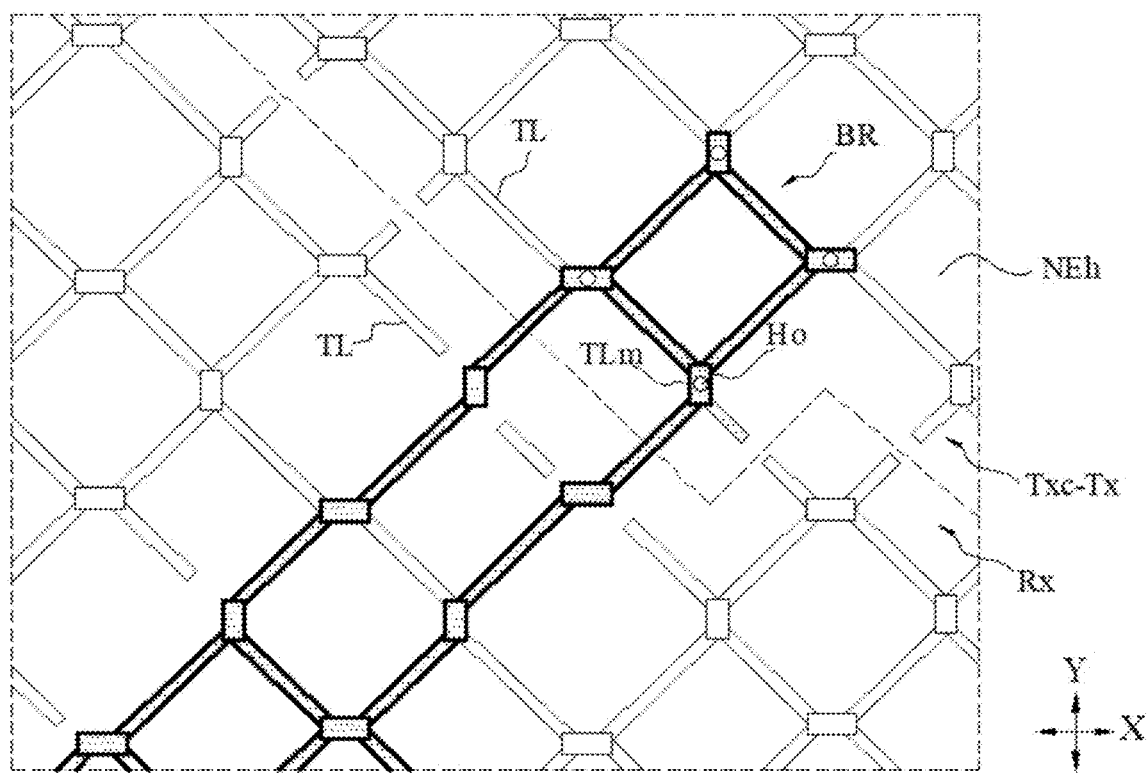
FIG. 12 is a schematic diagram of another touch structure of the present disclosure.

The embodiments of the present disclosure also provide another touch structure, and the structure of the touch structure may refer to the touch structure above, as shown in FIG. 12. The difference is that in the adapter line BL and the channel line TL that are overlapped, an extension direction of the adapter line BL is the same as an extension direction of the channel line TL, and an edge of an orthographic projection of the adapter line BL on the display substrate PNL is coincident with an edge of an orthographic projection of the channel line TL on the display substrate PNL, an orthographic projection of a boundary of the second touch electrode Rx on the display substrate PNL is discontinued at two sides of the orthographic projection of the adapter bridge BR on the display substrate PNL. Thus, instead of extending the path of the residual material of the electrode layer PL by outwardly expanding the guide portion GP and the adapter line BL relative to the channel line TL, only a distance between a local of the boundary of the second touch electrode Rx and the first electrode block Txc is increased, so as to increase the path of the residual material, improves the difficulty of the its continuous extension, thereby reducing the risk of the short circuit.

It should be noted that the adapter bridge BR is connected to both first electrode blocks Txc, the implementation above is described with a connection manner between the adapter bridge BR and one electrode block only, and the connection manner with the other electrode block may be the same as the connection manner above, which is not repeated herein.

The embodiment of the present disclosure also provides a touch display panel, as shown in FIG. 2, which may include a display substrate PNL and a touch structure, where:

The display substrate PNL may be an electroluminescent organic light-emitting display substrate PNL, a liquid crystal display substrate, and the like, the structure of which is not specially limited herein.

Taking the electroluminescent organic light-emitting display substrate PNL as an example, the electroluminescent organic light-emitting display substrate may include a driving backplane BP, a light-emitting element layer and an encapsulation layer TFE, where:

The driving backplane BP has a driving circuit, which may be configured to drive each light-emitting element of the light-emitting element layer to emit the light independently to display an image. In addition, the driving backplane BP may include a pixel region and a peripheral region located outside the pixel region, for example, the peripheral region may be a continuous or discontinuous annular area surrounding the pixel region.

The driving circuit may include a pixel circuit and a peripheral circuit. At least a partial region of the pixel circuit is disposed in the pixel region, and in addition, there may be a part of the pixel circuit in the peripheral region. The pixel circuit may have a structure such as 7T1C, 7T2C, 6T1C or 6T2C and the like, as long as it may drive the light-emitting element to emit the light, which is not specially limited herein. The number of pixel circuits is the same as the number of light-emitting elements, and the pixel circuits are connected with light-emitting elements in one-to-one correspondence, so as to control the light-emitting elements to independently emit the light respectively. nTmC represents one pixel circuit includes n transistors (represented by a letter "T") and m capacitors (represented by a letter "C").

The peripheral circuit is located in the peripheral region, and is connected with the pixel circuit for inputting a driving signal to the pixel circuit, so as to control the light-emitting element to emit the light. The peripheral circuit may include a gate driving circuit, a source driving circuit, a light-emitting control circuit, and the like. In addition, the peripheral circuit may also include other circuits, and a specific structure of the peripheral circuit is not specially limited herein.

The driving backplane BP may be formed of a plurality of film layers. For example, the driving backplane BP may include a substrate and a driving layer disposed on a side of the substrate, the substrate may be a single-layer or multi-layer structure, and may have a rigid or flexible structure, which is not specifically limited herein. The above-mentioned driving circuit may be located in the driving layer, and taking a transistor in the driving circuit as a top-gate thin film transistor as an example, the driving layer may include an active layer, a first gate insulating layer, a gate, a second gate insulating layer, an interlayer dielectric layer, a first source-drain layer, a passivation layer, a first planarization layer, a second source-drain layer and a second planarization layer.

The active layer is disposed on the substrate, and the first gate insulating layer covers the active layer. The gate is disposed on a surface of the first gate insulating layer away from the substrate, and is disposed exactly opposite to the active layer. The second gate insulating layer covers the gate and the first gate insulating layer, and the interlayer dielectric layer covers the second gate insulating layer. The first source-drain layer is disposed on a surface of the interlayer dielectric layer away from the substrate and includes a source and a drain, and the source and the drain are connected to the active layer. The passivation layer covers the first source-drain layer, and the first planarization layer covers the passivation layer. The second source-drain layer is disposed on a surface of the first planarization layer away from the substrate, and is connected with the first source-drain layer. The second planarization layer covers the second source-drain layers and the first planarization layer.

The light-emitting element layer is disposed on the side of the driving backplane BP, for example, the light-emitting element layer is disposed on a surface of the driving layer away from the substrate. The light-emitting element layer may include the plurality of light-emitting elements distributed in an array in the pixel region and a pixel definition layer defining each light-emitting element.

The pixel definition layer may be disposed on the side of the driving backplane BP, for example, the pixel definition layer is disposed on a surface of the second planarization layer away from the substrate. The pixel definition layer is used to separate light-emitting elements. Specifically, the pixel definition layer may be provided with a plurality of openings, and a range defined by each opening is a range of one light-emitting element. A shape of the opening, that is, an outline shape of an orthographic projection of the opening on the driving backplane BP may be a polygon, a smooth closed curve or other shapes, and the smooth closed curve may be a circle, an ellipse or a waist circle, and the like, which is not specially limited herein.

The pixel circuit may be connected to at least one light-emitting element, so as to emit the light under driving of the driving circuit. For example, the light-emitting element may be connected to the second source-drain layer, and may emit the light under the driving of the driving circuit. The light-emitting element may be an organic light-emitting diode, the light-emitting element may include a first electrode, a light-emitting functional layer and a second electrode stacked in sequence along a direction away from the driving backplane BP.

The first electrode may be disposed on the same surface of the driving backplane BP as the pixel definition layer, and may be used as an anode of the light-emitting element. Respective openings of the pixel definition layer expose respective first electrodes in one-to-one correspondence. The first electrode may be a single-layer or multi-layer structure, and its material may include one or more of conductive metals, metal oxides and alloys.

The light-emitting functional layer is at least partially disposed in the opening, and may include a hole injection layer, a hole transport layer, a light-emitting material layer, an electron transport layer and an electron injection layer sequentially stacked along the direction away from the driving backplane BP. Holes and electrons recombine into excitons in the light-emitting material layer, and the excitons radiate photons, thereby generating visible light. A specific light-emitting principle will not be described in detail herein.

The second electrode may cover the light-emitting functional layer, and may be used as a cathode of the light-emitting element. The second electrode may be a single-layer or multi-layer structure, and its material may include one or more of conductive metals, metal oxides and alloys.

Further, the light-emitting elements may share the same second electrode. Specifically, the second electrode is a continuous conductive layer covering the light-emitting functional layer of each light-emitting element and the pixel definition layer, that is, an orthographic projection of the second electrode on the pixel definition layer covers each opening.

The encapsulation layer TFE covers the light-emitting element layer, and may be used to protect the light-emitting element layer and block external water and oxygen from eroding the light-emitting element. For example, the encapsulation layer TFE may be implemented by means of Thin-Film Encapsulation, and may include a first inorganic layer, an organic layer and a second inorganic layer. The first inorganic layer covers the surface of the light-emitting element layer away from the driving backplane BP, for example, the first inorganic layer may cover the second electrode. The organic layer may be disposed on a surface of the first inorganic layer away from the driving backplane BP, a boundary of the organic layer is limited to inside of a boundary of the first inorganic layer, and a boundary of an orthographic projection of the organic layer on the driving backplane BP may be located in the peripheral region, ensuring that the organic layer may cover each light-emitting element. The second inorganic layer may cover the organic layer and the first inorganic layer not covered by the organic layer. The second inorganic layer may block water and oxygen intrusion, and the organic layer with flexibility may achieve planarization.

The touch structure may be arranged on a side of the encapsulation layer TFE away from the driving backplane BP, for example, the buffer layer BA may be arranged on the surface of the encapsulation layer TFE away from the driving backplane BP. An orthographic projection of the touch structure on the driving backplane BP at least covers the pixel region. The specific structure of the touch structure may refer to the above implementations of the touch structure, which is not described herein. The mesh NEh of the electrode layer PL in the touch structure may correspond to each light-emitting element, and the specific implementation may refer to the above implementation of the touch structure.

In addition, in some embodiments of the present disclosure, the touch display panel may also include a polarizing layer and a transparent cover plate, the polarizing layer is a circular polarizer that reduces the reflection of external light, and its specific principle is not described in detail. The transparent cover plate may be bonded to the polarizing layer and the planarization may be achieved. The transparent cover plate is used to protect the film layer below, and the material may be glass or acrylic and other transparent materials, which is not specially limited herein.

The embodiments of the present disclosure further provide a display device, and the display device may include the touch display panel of any of the above-mentioned embodiments, and for its specific structure and beneficial effects, reference can be made to the embodiments of the touch structure and touch display panel, which will not be repeated here. The display device may be an electronic device with an touch display function, such as a mobile phone, a tablet computer, and the like, which is not listed herein.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A touch structure, arranged on a side of a display substrate, wherein the touch structure comprises a plurality of first touch electrodes and a plurality of second touch electrodes, the first touch electrodes are distributed at intervals along a row direction, the first touch electrode comprises a plurality of first electrode blocks and an adapter bridge, the plurality of first electrode blocks are distributed at intervals along a column direction, the adapter bridge is connected to two adjacent first electrode blocks; the second touch electrodes are distributed at intervals along the column direction, the second touch electrode comprises a plurality of second electrode blocks connected in series along the row direction; the adapter bridge and the second touch electrode are intersected; the first electrode blocks and the second electrode blocks are located at a same electrode layer, the adapter bridge is located at a side of the electrode layer, and an insulating layer is arranged between the adapter bridge and the electrode layer;

each of the first touch electrode and the second touch electrode is a grid-shaped structure formed by a plurality of grid lines, a grid line of the adapter bridge is an adapter line, and a grid line of the first electrode block and a grid line of the second electrode block are channel lines; and at least a side of the adapter bridge is connected to a guide portion disposed on the same layer as the adapter bridge;

in the adapter bridge, the first electrode block connected to the adapter bridge and the second touch electrode intersected with the adapter bridge, the guide portion overlaps with at least one channel line of a boundary of one of the first electrode block and the second touch electrode, a part of the adapter line overlaps with a part of a channel line of a boundary of at least one of the first electrode block or the second touch electrode; and an adapter line connected to the guide portion overlaps with a part of the channel line of the boundary of one of the first electrode block and the second touch electrode;

in the guide portion and the channel line that are overlapped, an extension direction of the guide portion is the same as an extension direction of the channel line, and at least partial edge of an orthographic projection of the guide portion on the display substrate is located outside an edge of an orthographic projection of the channel line on the display substrate;

wherein in the adapter bridge and the first electrode block connected to the adapter bridge:

the adapter bridge is connected to the first electrode block through a plurality of via holes running through the insulating layer;

a region where the channel lines of the first electrode block are intersected is a channel intersection region, a region where the adapter lines are intersected is an adapter intersection region, a boundary of the first electrode block is provided with a plurality of the channel intersection regions, and the channel intersection regions of the boundary of the first electrode block and at least a part of the adapter intersection regions are overlapped in one-to-one correspondence;

in the adapter intersection region and the channel intersection region that are overlapped on the boundary of the first electrode block, a boundary of an orthographic projection of the adapter intersection region on the display substrate is located outside a boundary of an orthographic projection of the channel intersection region on the display substrate.

2. The touch structure according to claim 1, wherein a plurality of channel lines overlapped with the guide portion are provided, the guide portion comprises a plurality of guide lines, the plurality of guide lines are sequentially connected along an extension direction of a channel line corresponding to the guide portion towards a direction away from the adapter bridge, and the guide line overlaps with the channel line.

3. The touch structure according to claim 2, wherein one guide line of the guide lines of the guide portion furthest from the adapter bridge overlaps with a portion of the channel line that is discontinuously arranged into two portions.

4. The touch structure according to claim 1, wherein one guide line of the guide lines of the guide portion furthest from the adapter bridge overlaps with a portion of the channel line that is discontinuously arranged into two portions, one portion of the channel line that is discontinuously arranged into the two portions belongs to the first touch electrode, and the other portion belongs to the second touch electrode.

5. The touch structure according to claim 1, wherein the grid-shaped structure is defined with a plurality of meshes, the mesh of the electrode layer is surrounded by the plurality of channel lines, and the channel intersection region forms a vertex of the mesh;

in the adapter bridge and the first electrode block connected to the adapter bridge:

the plurality of via holes are provided, the plurality of via holes are provided are located at the plurality of channel intersection regions of the same mesh, respectively; at most a part of the via holes are located on the boundary of the first electrode block;

the adapter intersection region where at least one via hole located at the boundary of the first electrode block is located is connected to an end, connected to the adapter bridge, of the guide portion.

6. The touch structure according to claim 5, wherein in the adapter bridge, the first electrode block connected to the adapter bridge and the second touch electrode intersected with the adapter bridge, two sides of the adapter bridge are connected to guide portions overlapped with the boundary of the first electrode block, and two of the guide portions overlapped with the boundary of the first electrode block are connected through at least one adapter line; the boundary of the first electrode block is connected at a region between the two guide portions through at least one channel line, and the channel line overlaps with the adapter line between the two guide portions;

in the adapter line and the channel line that are overlapped, an extension direction of the adapter line is the same as an extension direction of the channel line, and an edge of an orthographic projection of the adapter line on the display substrate is located outside an edge of an orthographic projection of the channel line on the display substrate.

7. The touch structure according to claim 5, wherein in the adapter bridge, the first electrode block connected to the adapter bridge and the second touch electrode intersected with the adapter bridge, two sides of the adapter bridge are connected to guide portions overlapped with the boundary of the first electrode block, and two of the guide portions overlapped with the boundary of the first electrode block are connected through at least one adapter line, and the boundary of the first electrode block is discontinuously arranged at a region between the two guide portions.

8. The touch structure according to claim 6, wherein in the adapter bridge, the first electrode block connected to the adapter bridge and the second touch electrode intersected with the adapter bridge, a part of the adapter lines overlap with a boundary of the second touch electrode, and the adapter lines overlapped with the channel line of the boundary of the second touch electrode are sequentially connected along an extension direction of the boundary of the second touch electrode.

9. The touch structure according to claim 6, wherein an orthographic projection of a boundary of the second touch electrode on the display substrate is discontinued at two sides of an orthographic projection of the adapter bridge on the display substrate.

10. The touch structure according to claim 9, wherein a part of the orthographic projection of the boundary of the second touch electrode on the display substrate is located within a boundary of the orthographic projection of the adapter bridge on the display substrate.

11. The touch structure according to claim 1, wherein in the adapter line and the channel line that are overlapped, a distance between an edge of an orthographic projection of the adapter line on the display substrate and the edge of the orthographic projection of the channel line on the display substrate is 0.9 μm to 1.5 μm.

12. The touch structure according to claim 1, wherein in the guide portion and the channel line that are overlapped, a distance between the edge of the orthographic projection of the guide portion on the display substrate and the edge of the orthographic projection of the channel line on the display substrate is 0.9 μm to 1.5 μm.

13. The touch structure according to claim 1, wherein in the adapter intersection region and the channel intersection region that are overlapped, a distance between an edge of the orthographic projection of the adapter intersection region on the display substrate and an edge of the orthographic projection of the channel intersection region on the display substrate is 0.9 μm to 1.5 μm.

14. A touch structure, arranged on a side of a display substrate, wherein the touch structure comprises a plurality of first touch electrodes and a plurality of second touch electrodes, the first touch electrodes are distributed at intervals along a row direction, the first touch electrode comprises a plurality of first electrode blocks and an adapter bridge, the plurality of first electrode blocks are distributed at intervals along a column direction, the adapter bridge is connected to two adjacent first electrode blocks; the second touch electrodes are distributed at intervals along the column direction, the second touch electrode comprises a plurality of second electrode blocks connected in series along the row direction; the adapter bridge and the second touch electrode are intersected; the first electrode blocks and the second electrode are located at a same electrode layer, the adapter bridge is located at a side of the electrode layer, and an insulating layer is arranged between the adapter bridge and the electrode layer;

each of the first touch electrode and the second touch electrode is a grid-shaped structure formed by a plurality of grid lines, a grid line of the adapter bridge is an adapter line, and a grid line of the first electrode block and a grid line of the second electrode block are channel lines;

in the adapter bridge, the first electrode block connected to the adapter bridge and the second touch electrode intersected with the adapter bridge, a part of the adapter line overlaps with a part of a channel line of a boundary of at least one of the first electrode block or the second touch electrode;

in the adapter line and the channel line that are overlapped, an extension direction of the adapter line is the same as an extension direction of the channel line, and an edge of an orthographic projection of the adapter line on the display substrate is coincident with an edge of an orthographic projection of the channel line on the display substrate;

an orthographic projection of a boundary of the second touch electrode on the display substrate is discontinued at two sides of an orthographic projection of the adapter bridge on the display substrate;

wherein in the adapter bridge and the first electrode block connected to the adapter bridge:

the adapter bridge is connected to the first electrode block through a plurality of via holes running through the insulating layer;

a region where the channel lines of the first electrode block are intersected is a channel intersection region, a region where the adapter lines are intersected is an adapter intersection region, a boundary of the first electrode block is provided with a plurality of the channel intersection regions, and the channel intersection regions of the boundary of the first electrode block and at least a part of the adapter intersection regions are overlapped in one-to-one correspondence;

in the adapter intersection region and the channel intersection region that are overlapped on the boundary of the first electrode block, a boundary of an orthographic projection of the adapter intersection region on the display substrate is located outside a boundary of an orthographic projection of the channel intersection region on the display substrate.

15. The touch structure according to claim 14, wherein a part of the orthographic projection of the boundary of the second touch electrode on the display substrate is located within a boundary of the orthographic projection of the adapter bridge on the display substrate.

16. A touch display panel, comprising:

a display substrate; and a touch structure;

wherein the touch structure is arranged on a side of a display substrate, wherein the touch structure comprises a plurality of first touch electrodes and a plurality of second touch electrodes, the first touch electrodes are distributed at intervals along a row direction, the first touch electrode comprises a plurality of first electrode blocks and an adapter bridge, the plurality of first electrode blocks are distributed at intervals along a column direction, the adapter bridge is connected to two adjacent first electrode blocks; the second touch electrodes are distributed at intervals along the column direction, the second touch electrode comprises a plurality of second electrode blocks connected in series along the row direction; the adapter bridge and the second touch electrode are intersected; the first electrode blocks and the second electrode blocks are located at a same electrode layer, the adapter bridge is located at a side of the electrode layer, and an insulating layer is arranged between the adapter bridge and the electrode layer;

each of the first touch electrode and the second touch electrode is a grid-shaped structure formed by a plurality of grid lines, a grid line of the adapter bridge is an adapter line, and a grid line of the first electrode block and a grid line of the second electrode block are channel lines; and at least a side of the adapter bridge is connected to a guide portion disposed on the same layer as the adapter bridge;

in the adapter bridge, the first electrode block connected to the adapter bridge and the second touch electrode intersected with the adapter bridge, the guide portion overlaps with at least one channel line of a boundary of one of the first electrode block and the second touch electrode, a part of the adapter line overlaps with a part of a channel line of a boundary of at least one of the first electrode block or the second touch electrode; and an adapter line connected to the guide portion overlaps with a part of the channel line of the boundary of one of the first electrode block and the second touch electrode;

in the guide portion and the channel line that are overlapped, an extension direction of the guide portion is the same as an extension direction of the channel line, and at least partial edge of an orthographic projection of the guide portion on the display substrate is located outside an edge of an orthographic projection of the channel line on the display substrate;

wherein in the adapter bridge and the first electrode block connected to the adapter bridge:

the adapter bridge is connected to the first electrode block through a plurality of via holes running through the insulating layer;

a region where the channel lines of the first electrode block are intersected is a channel intersection region, a region where the adapter lines are intersected is an adapter intersection region, a boundary of the first electrode block is provided with a plurality of the channel intersection regions, and the channel intersection regions of the boundary of the first electrode block and at least a part of the adapter intersection regions are overlapped in one-to-one correspondence;

in the adapter intersection region and the channel intersection region that are overlapped on the boundary of the first electrode block, a boundary of an orthographic projection of the adapter intersection region on the display substrate is located outside a boundary of an orthographic projection of the channel intersection region on the display substrate;

wherein the adapter bridge is arranged on a side of the display substrate, the insulating layer covers the adapter bridge, and the electrode layer is arranged on a surface of the insulating layer away from the display substrate.

17. The touch structure according to claim 1, wherein both cross sections of the guide portion and the adapter bridge are be trapezoidal.

18. The touch structure according to claim 1, wherein thicknesses of the guide portion and the adapter bridge are the same and materials of the guide portion and the adapter bridge are the same.

19. The touch structure according to claim 1, wherein in the adapter line and the channel line that are overlapped, a distance between an edge of an orthographic projection of the adapter line on the display substrate and the edge of the orthographic projection of the channel line on the display substrate is 1.2 μm.

20. The touch structure according to claim 1, wherein in the guide portion and the channel line that are overlapped, a distance between the edge of the orthographic projection of the guide portion on the display substrate and the edge of the orthographic projection of the channel line on the display substrate is 1.2 μm.

* * * * *